United States Patent [19]

Ujikawa et al.

[11] 4,366,290

[45] Dec. 28, 1982

[54] UNSATURATED POLYESTER RESIN COMPOSITION

[75] Inventors: Norihisa Ujikawa, Aichi; Masaharu Nakayama, Nagoya, both of Japan

[73] Assignee: Nippon Oil and Fats Co., Ltd., Tokyo, Japan

[21] Appl. No.: 282,884

[22] Filed: Jul. 13, 1981

[30] Foreign Application Priority Data

Jul. 17, 1980 [JP] Japan .................................. 55-97893

[51] Int. Cl.³ .............................................. C08L 67/06
[52] U.S. Cl. ..................................... 525/169; 525/170
[58] Field of Search ........................ 525/170, 439, 169

[56] References Cited

U.S. PATENT DOCUMENTS

| | | | |
|---|---|---|---|
| 4,226,961 | 10/1980 | Motz | 525/439 |
| 4,252,922 | 2/1981 | Adelman et al. | 525/439 |
| 4,299,927 | 11/1981 | Dombrowski | 525/170 |

FOREIGN PATENT DOCUMENTS 49-116189 9/1974 Japan .
50-51188 8/1975 Japan .

*Primary Examiner*—Allan Lieberman
*Attorney, Agent, or Firm*—Flynn, Thiel, Boutell & Tanis

[57] ABSTRACT

An unsaturated polyester resin composition which is obtained by incorporating a thermoplastic random-copolymer having peroxycarbonate groups in the molecule thereof into an unsaturated polyester resin, which composition is excellent in low shrinkage characteristics and it is not weakened in mechanical strength.

5 Claims, No Drawings

UNSATURATED POLYESTER RESIN COMPOSITION

BACKGROUND OF THE INVENTION

This invention relates to an unsaturated polyester resin composition which possesses excellent low shrinkage and also excellent mechanical strength.

Sheet molding compounds (hereinafter referred to as SMCs), bulk molding compounds and the like, which are prepared by blending unsaturated polyester resins with fillers, pigments, thickeners, fiber reinforcing materials, hardening agents, stabilizers, mold releasing agents and the like, have recently been used in increasing amounts as new industrial materials. These compositions fulfill the requests for materials capable of reducing the labor cost and improving the productivity and the working environment in the reinforced plastic industry.

However, molded products of unsaturated polyester resins tend to have cracks, distortions, warps, waviness and the like, since the resins show large shrinkage on hardening and the shrinkage causes embossings of reinforcing agents and peelings at the interface. In addition, it is difficult to produce molded products of high dimensional precision because of the shrinkage on hardening.

For improving these drawbacks, the practice has been generally adopted of blending thermoplastic resins or saturated polyesters with the unsaturated polyester resins. There have been proposed various unsaturated polyester resin compositions, for example, an unsaturated polyester resin composition comprising (1) a reaction product of an unsaturated monoglycidyl compound with a saturated polyester which consists of a saturated polycarboxylic acid and polyhydric alcohol, and which has a molecular weight of 3,000–50,000, (2) an unsaturated polyester resin and (3) a monomer copolymerisable with the said (2) unsaturated polyester resin (Japanese Patent Laid-Open Publication No. 52-3 9785). Another such composition comprises an unsaturated polyester resin composition which is produced by blending an unsaturated polyester alkyd with a liquid unsaturated polyester resin which is produced by first esterifying a dicarboxylic acid mixture of not less than 50 mole % of an unsaturated dicarboxylic acid and not more than 50 mole % of a saturated dicarboxylic acid with a glycol, and second by blending the esterified product with a vinyl monomer crosslinking agent. Said unsaturated polyester alkyd is prepared by esterifying a dicarboxylic acid mixture of not more than 10 mole % of an saturated dicarboxylic acid and not less than 90 mole % of a saturated dicarboxylic acid, with a glycol (Japanese Patent Laid-Open Publication No. 50-5 1188). A third such composition is an unsaturated polyester resin composition comprising at least two unsaturated resins different in polymerization characteristics (Japanese Patent Laid-Open Publication No. 116189/1974).

In these processes, there are drawbacks, such as the blended thermoplastic polymers or the saturated polyesters do not participate in the crosslinking upon curing, with the result being that they exist in the molded product in a separated state and accordingly the molded product is weakened in the mechanical strength thereof and the additives therein are forced up to the surface of the molded product, making its appearance remarkably poor.

SUMMARY OF THE INVENTION

An object of this invention is to provide a low shrinkage unsaturated polyester resin composition in which the mechanical strength is preserved. This invention is based on the finding that an unsaturated polyester resin composition which has excellent low shrinkage characteristics can be prepared, without decreasing the mechanical strength thereof, by incorporating a thermoplastic random-copolymer having peroxycarbonate groups in the molecules thereof into the unsaturated polyester resin.

The unsaturated polyester composition of this invention is prepared by incorporating:

(a) 100 parts by weight of an ethylenically $\alpha,\beta$-unsaturated polyester;

(b) from 3 to 30 parts by weight of a random copolymer having peroxycarbonate groups therein and comprising units of the general formula (II)

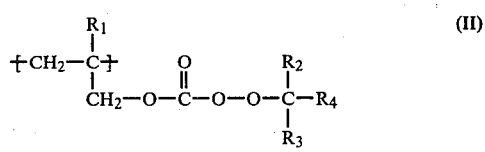

wherein $R_1$ represents a member selected from the group consisting of a hydrogen atom and $C_{1-4}$ alkyl groups; $R_2$ and $R_3$ each represent a member selected from the group consisting of $C_{1-4}$ alkyl groups; and $R_4$ represents a member selected from the group consisting of $C_{1-12}$ alkyl groups and $C_{3-12}$ cycloalkyl groups, and units of the general formula

wherein A represents units in the copolymer, which units are the monofunctional unconjugated monomer given below or a mixture of these monomers. The random copolymer is prepared by radical-copolymerizing an unsaturated peroxycarbonate of the general formula (I)

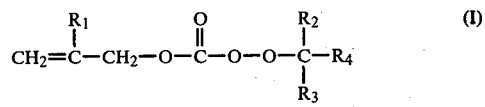

wherein $R_1$, $R_2$, $R_3$ and $R_4$ have the same meanings given above for the general formula (II), with one or a mixture of monofunctional unconjugated monomers having Alfred Price's Q values of not more than 0.2, at a polymerization temperature ranging from 0° C. to 110° C., in the presence of a radical polymerization initiator; and (c) from 27 to 190 parts by weight of a polymerizable monomer. The above-stated ethylenically $\alpha,\beta$-unsaturated polyester (a) is prepared from an ethylenically $\alpha,\beta$-unsaturated dibasic acid or alkyl ester thereof, a saturated dibasic acid or alkyl ester thereof and a glycol.

There are no special restrictions on the species and the amount of the ethylenically $\alpha,\beta$-unsaturated dibasic acid. The ethylenically $\alpha,\beta$-unsaturated dibasic acids include, for example, maleic anhydride, maleic acid, fumaric acid, mesaconic acid, citraconic acid, itaconic acid, a chlorinated maleic acid and alkyl esters of these acids. The saturated dibasic acids include, for example, phthalic anhydride, phthalic acid, isophthalic acid, terephthalic acid, tetrahydrophthalic acid, a halogenated phthalic anhydride, adipic acid, succinic acid, sebacic acid, and alkyl esters of these acids. The glycols include, for example, ethylene glycol, diethylene glycol, propylene glycol, dipropylene glycol, butylene glycol, neopentyl glycol, hexylene glycol, hydrogenated bisphenol A, 2,2'-di-(4-hydroperoxyphenyl) propane, 2,2'-di-(4-hydroxyethoxyphenyl) propane, ethylene oxide and propylene oxide. Concrete examples of the unsaturated peroxycarbonate used for preparing the (b) random copolymers having peroxycarbonate groups, which are incorporated into the composition of this invention, include, for example, t-butylperoxyallylcarbonate, t-hexylperoxyallylcarbonate, 1,1,3,3-tetramethylbutylperoxyallylcarbonate, p-menthanperoxyallylcarbonate, t-butylperoxymethallylcarbonate, 1,1,3,3-tetramethylbutylperoxymethallylcarbonate, p-menthanperoxymethallylcarbonate and the like. The chemical structures of two of them are illustrated as follows:

t-butylperoxyallylcarbonate

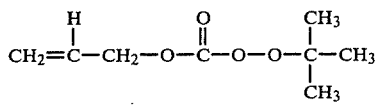

t-hexylperoxyallylcarbonate

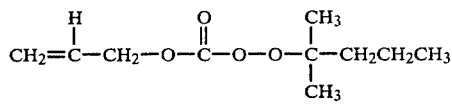

On the other hand, the monofunctional unconjugated monomer which is random-copolymerized with the above stated unsaturated peroxycarbonate is a monofunctional unsaturated monomer having an Alfred Price's Q value of not more than 0.2, which value is described in "Copolymerization 1. Analysis of Reaction" edited by the High Molecular Chemical Society (Baifukan Publishers) at page 89 (1975). Major members of the group of monofunctional unsaturated monomers are described in the "Polymer Handbook" compiled by J, Brandwrap and E. H. Imergat (Willy Interscience Publication) No. 2, at pages 387-404 (1975).

For example, vinyl acetate, vinyl chloride, ethylene, allyl acetate, allyl chloroacetate, vinyl chloroacetate, butyl 3-butoxyacrylate, allyl alcohol, 1,2-dichloroethylene, dibutyl maleate, diethyl maleate, isopropyl maleate, dimethyl maleate, methyl maleate and the like are preferable monomers. They are used individually or as mixtures thereof.

The ratio of the peroxide component (copolymerization ratio of the peroxide), which component is contained in the random copolymers having the peroxycarbonate groups, used in this invention is determined by such conditions as the charging ratios of each component and the polymerization process.

Accordingly, it is possible to produce the random copolymers of the desired copolymerization ratio, when the relationships of the conditions are previously estimated as a parameter. The content of the peroxycarbonate groups which are contained in the random copolymers is preferably in a range of 0.5 to 20% by weight.

The content of peroxycarbonate groups contained in the random copolymers is especially greatly influenced by the copolymerization temperature. Accordingly, it is desirable to carry out the copolymerization under conditions such that the peroxy bonds are not cleaved, that is, at a temperature ranging from 0° C. to 110° C., preferably from 10° C. to 90° C. As for radical polymerization initiators effectively used within this range, there can be mentioned, for example, acetylcyclohexylsulfonylperoxide, isobutylperoxide, diisopropylperoxydicarbonate, lauroyl peroxide, benzoyl peroxide, t-butylperoxyisobutyrate, 1,1-bis-(t-butylperoxy)-3,3,5-trimethylcyclohexane, azobisisobutyronitrile, azobisdimethylvaleronitrile, a persulfate and a persulfate-bisulfite binary system initiator and the like.

Production of the above stated random copolymers having the peroxycarbonate groups can be carried out by a known conventional technique including bulk polymerization, solution polymerization, and emulsion or suspension polymerization using a batch system, continuous system or a process in which the unsaturated monomer and the other components are intermittently added. The above stated random copolymer, which is in a state of emulsion or suspension, is generally produced in an aqueous phase and in the presence of a conventional amount of an emulsifier and/or a protective colloid.

The degree of polymerization of the above stated random copolymers having the peroxycarbonate groups used in this invention decreases as the charging ratio of the unsaturated peroxy carbonate, one of the starting materials, increases. However, the degree of polymerization can be controlled within a wide range by using a compensation agent, such agents including aldehydes, halogenated hydrocarbons, mercaptans, lower aliphatic alcohols and/or lower aliphatic esters, in an amount ranging from 0.01 to 5% by weight based on the amount of all the monomers, as in a conventional process. It is preferable that the random copolymers have mean molecular weights ranging from $1 \times 10^4$ to $3 \times 10^5$. A mean molecular weight less than $1 \times 10^4$ gives an insufficient low shrinkage effect, and a molecular weight higher than $3 \times 10^5$ results in elevated viscosity values of the solution of the random copolymer dissolved in a polymerizable monomer, which undesirably affects the workability.

The amount of random copolymer having the peroxycarbonate groups used in this invention, to be incorporated into the ethylenically $\alpha,\beta$-unsaturated polyester, is preferably in a range from 3 to 30 parts by weight based on 100 parts by weight of the ethylenically $\alpha,\beta$-unsaturated polyester. Use of an amount less than 3 parts by weight can not give a sufficient effect of decreasing the shrinkage, and on the other hand, an amount of more than 30 parts by weight undesirably results in weakening the mechanical strength inherent in the unsaturated polyester.

As the above stated (c) polymerizable monomer, styrene monomers such as styrene, vinyltoluene and chlorostyrenes, diallylpthalate, vinyl acetate, acrylic acid esters and methacrylic acid esters can be exemplified, of which the styrene monomers are especially preferable. The amount of the polymerizable monomer to be used is conventional, for example, from 27 to 190 parts by weight based on 100 parts by weight of the ethylenically $\alpha,\beta$-unsaturated polyester.

The random copolymers having the peroxycarbonate groups used in this invention, which are incorporated into the ethylenically $\alpha,\beta$-unsaturated polyesters, participate in the crosslinking reaction on hardening through their peroxycarbonate groups and further probably undergo chemical interaction with the fillers. In addition, the constitution unit -[A]- -based on one or a mixture of the above stated monofunctional unconjugated monomers, contributes the low shrinking characteristics of the hardened product.

Therefore, molded products which have no additives that rise to the surfaces thereof, such as occurs with conventional ones, can be produced without weakening the mechanical strength thereof, and the products are excellent in low shrinking characteristics.

This invention is further illustrated in detail by means of Examples, Reference Examples and Comparative Tests. Values of parts and percentages are by weight throughout the Examples, Reference Examples and Comparative Tests.

Reference Examples 1 to 3

[Preparation of Random Copolymers of t-Butylperoxyallylcarbonate and Vinylacetate]

In a 300 ml glass reaction vessel provided with a stirrer, a thermometer and a reflux condenser, there were charged t-butylperoxyallylcarbonate of 94% purity (hereinafter referred to as BPAC), vinyl acetate of 100% purity (hereinafter referred to as VAC) and methanol, respectively, in amounts as shown in Table 1. After the content of the reaction vessel was heated up to 60° C., t-butylperoxypivalate (hereinafter referred to as BPPV) in amounts as shown in Table 1 was added dropwise and the copolymerization was carried out for 6 hours under stirring in an atmosphere of nitrogen gas passed through the vessel.

Afterward, the solvents were removed to dry the products, thereby obtaining the product random copolymers. The copolymerization ratios were determined by measuring the amounts of the products by weight, and further the contents of the active oxygen of the random copolymers were determined by means of iodometry (available oxygen) to calculate the BPAC constitution unit contents.

In further addition, the intrinsic viscosity values were measured in a solvent of benzene at 30° C. to calculate the average molecular weights.

The obtained results are shown in Table 1

TABLE 1

Production of BPAC—VAC Random Copolymer by Means of Solution Polymerization

| | | No. of Reference Example | | |
|---|---|---|---|---|
| | | 1 | 2 | 3 |
| Amount of charge | Amount of BPAC (g) | 0.5 | 2.0 | 4.0 |
| | Amount of VAC (g) | 99.5 | 98.0 | 96.0 |
| | Amount of methanol (g) | 100.0 | 100.0 | 100.0 |
| | Amount of BPPV (g) | 0.1 | 0.1 | 0.1 |
| Random Copolymer | Ratio of Copolymerization | 85.0 | 82.4 | 80.4 |
| | Active oxygen content % | 0.05 | 0.19 | 0.39 |
| | Content of BPAC Constitution unit (%) | 0.5 | 2.1 | 4.2 |
| | Average molecular weight | 100,000 | 56,000 | 34,000 |

From the characteristic values shown below, it was confirmed that the resulting random copolymers were composed of a constitution unit of the formula

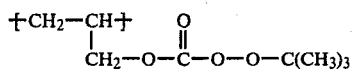

and a constitution unit of the formula

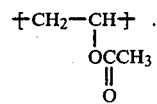

Characteristic Infrared Absorption Bands in Infrared Absorption Spectrum
  $Vc=O$ due to peroxycarbonate 1790 cm$^{-1}$
  $Vc=O$ due to acetates 1740 cm$^{-1}$
Chemical Shift in Nuclear Magnetic Resonance
  ($\delta$ value) (Solvent=CDCl$_3$)
  1.38 (singlet, —C(C$\underline{H}_3$)$_3$)
  2.08 (singlet, —COC$\underline{H}_3$)
  4.28 (singlet, —C$\underline{H}_2$—O—)
  5.08 (singlet,

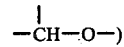

Reference Example 4

[Preparation of a Random Copolymer of t-Butylperoxyallylcarbonate-Vinylacetate by Suspension Polymerization]

In a 500 ml glass reaction vessel which was provided with a stirrer, a thermometer and a reflux condenser, there were charged 15.0 g of BPAC of 94% purity, 85.0 g of VAC of 100% purity and 200.0 g of a 1% aqueous solution of polyvinyl alcohol (degree of saponification 89%). After the content of the reaction vessel was heated up to a temperature of 60° C., 1.0 g of BPPV was added dropwise to conduct copolymerization for 6 hours under stirring in an atmosphere of nitrogen gas passed through the vessel.

As a result, a BPAC-VAC random copolymer showing a ratio of copolymerization of 75.0%, and having an active oxygen content of 1.37%, a BPAC constitution unit content of 15.1% and an average molecular weight of 150,000 was obtained.

Reference Example 5

[Preparation of a Random Copolymer of t-Hexylperoxyallycarbonate-Vinylacetate by Solution Polymerization]

Copolymerization was carried out in the same way as in Reference Example 3 except that t-hexylperoxyallylcarbonate (hereinafter referred to as HPAC) of 92% purity was used instead of BPAC. As the result, a HPAC-VAC random copolymer showing a ratio of copolymerization of 85.0% and having an active oxygen content of 0.26%, a HPAC constitution unit content of 3.2%, and an average molecular weight of 35,000 was obtained.

Reference Examples 6 and 7

[Preparation of a Vinylacetate Polymer by Solution Polymerization]

Into a 200 ml glass reaction vessel provided with a stirrer, a thermometer and a reflux condenser, there were charged VAC of 100% purity and methanol in amounts shown in Table 2. Benzoyl peroxide (hereinafter referred to as BPO) in amounts shown in Table 2 was added dropwise to conduct polymerization for times shown in Table 2 under stirring in an atmosphere of nitrogen gas which was passed through the vessel.

Afterward, the solvent was removed to dry the product. Polymerization ratios were determined by measuring the amounts of the products. The intrinsic viscosity values were measured to calculate the average molecular weights. The obtained results are shown in Table 2.

TABLE 2

Production of VAC Polymer by Solution Polymerization

|  |  | No. of Reference Example | |
|---|---|---|---|
|  |  | 6 | 7 |
| Charging condition | Amount of VAC (g) | 85.0 | 50.0 |
|  | Amount of methanol (g) | 15.0 | 50.0 |
|  | Amount of BPO (g) | 0.04 | 0.11 |
|  | Polymerization time (hrs) | 16.0 | 16.0 |
| VAC Polymer | Polymerization ratio (%) | 96.2 | 97.5 |
|  | Average molecular weight | 160,000 | 36,000 |

Reference Example 8

[Preparation of a Random Copolymer of t-Butylperoxycarbonate-Vinyl chloride by Suspension Polymerization]

Into an autoclave of 300 ml capacity made of stainless steel, there were charged 0.6 g of BPAC of 94% purity, 29.4 g of vinyl chloride (hereinafter referred to as VCL) of 100% purity and 0.01 g of diisopropylperoxydicarbonate of 99% purity and further 100 ml of 0.2% aqueous solution of polyvinyl alcohol (degree of saponification 89%). After the atmospheric environment in the autoclave was replaced with nitrogen, polymerization was carried out at 52° C. for 6 hours.

As the result, a BPAC-VCL random copolymer of average degree of polymerization of 1,000, which contained 0.19% of active oxygen and 2.1% of BPAC constitution units, was obtained.

Reference Example 9

[Preparation of an Unsaturated Polyester Resin]

An ethylenically $\alpha,\beta$-unsaturated polyester (acid value: 30) was synthesized by esterifying 812 parts of fumaric acid, 498 parts of isophthalic acid, 396 parts of propyleneglycol and 542 parts of neopentylglycol. The resultant ethylenically $\alpha,\beta$-unsaturated polyester was diluted with styrene (hereinafter referred to as ST) to give a ST concentration of 35% and then an unsaturated polyester resin (hereinafter referred to as UPR) was prepared.

EXAMPLES 1–6

[Production of SMC and Compression Molding]

ST solutions of BPAC-VAC random copolymers having a concentration thereof of 40%, were prepared by respectively dissolving BPAC-VAC random copolymers obtained in Reference Examples 1, 2, 3, and 4 into ST and each solution was blended with UPRs obtained in Reference Example 9 in ratios as shown in Table 3 to produce SMCs under the mixing conditions as shown in Table 3, which SMCs were the unsaturated polyester resin compositions.

The resultant respective SMCs were aged to achieve thickening at 40° C. for 24 hours.

Immediately after the aging was over, the SMCs were pressed in a mold under the pressure of 100 kg/cm$^2$ at a temperature of 140° C. for 4 minutes, thereby obtaining moldings.

[Measurement of Mechanical Strength]

According to Japanese Industrial Standard K-6911 (General testing method for thermosetting plastics), sample specimens were prepared by cutting off portions of the above obtained moldings. The tensile strength and bending strength thereof were measured by using a measuring apparatus which was manufactured by Shimazu Manufacturing Co., Ltd (called as Autograph DSS-5000 type), according to Japanese Industrial Standard K-6911. The obtained results are shown in Table 3.

[Measurement of Mold Shrinkage]

Mold shrinkage was measured from the dimensions of the mold used, and the obtained molding, according to the following formula $$\text{Mold shrinkage} = \frac{\left(\begin{array}{c}\text{Inner dimension}\\\text{of mold}\end{array}\right) - \left(\begin{array}{c}\text{Measured dimension}\\\text{of molding}\end{array}\right)}{(\text{Inner Dimension of Mold})} \times 100(\%)$$

Comparative tests 1–4

Compression molding was carried out according to the same procedures as used in Examples 1–6, except that VAC polymers which were prepared in Reference Examples 6 and 7 under the mixing conditions as shown in Table 3 were used instead of BPAC-VAC random copolymers used in Examples 1 to 6. The mechanical strength and mold shrinkage of the respectively obtained moldings were measured according to the same procedures as in Examples 1 to 6.

The obtained results are shown in Table 3.

Comparative Test 5

Compression molding was carried out in the same manner as in Examples 1 to 6, except that BPAC-VAC random copolymers were not used and the mixing conditions as shown in Table 3 were adopted to produce an SMC. The mechanical strength and mold shrinkage were measured in the same way as in Examples 1 to 6. The obtained results are shown in Table 3.

As is apparent from Table 3, it was confirmed that the SMC compression-moldings obtained by Examples 1 to 6, in which the unsaturated polyester resin composition of the present invention was used, showed excellent low shrinkages without weakening the mechanical strength, as compared with the SMC compression-molding of Comparative Test 5 in which no additive for reducing the shrinkage therefor was used, or the SMC compression-moldings of Comparative Tests 1-4 in which a VAC polymer was incorporated.

EXAMPLE 7

SMC was produced, according to the same procedures as used in Example 1, by using the HPAC-VAC random copolymer prepared in Reference Examples 5 instead of the BPAC-VAC random copolymer of Example 1. The resultant SMC was aged at 40° C. for 24 hours, and then compression-molded at 140° C. under the pressure of 100 kg/cm² for 4 minutes.

The obtained product was measured for the mechanical strength and mold shrinkage thereof according to the same procedures as in Example 1. The SMC compression molding was obtained, and its tensile strength was 6.20 kg/cm², its bending strength was 9.19 kg/mm² and its mold shrinkage was 0.25%. It was proved that a product which was excellent in low shrinkage could also be produced in this Example without weakening the mechanical strength as compared with Comparative Tests 1-4.

EXAMPLE 8

[Production of SMC and Compression Molding]

An SMC was produced by blending the BPAC-VCL random copolymer prepared in Reference Example 8, the UPR prepared in Reference Example 9, and ST in the mixing ratio as shown in Table 4. The resultant SMC was aged at 40° C. for 24 hours.

Immediately after the aging was over, the SMC was pressed at 140° C. under the pressure of 100 kg/cm² for 4 minutes, thereby obtaining a molding.

[Measurement of Mechanical Strength and Mold Shrinkage]

The mechanical strength and mold shrinkage of the obtained SMC compression molding were measured in the same way as in Examples 1 to 6.

The obtained results are shown in Table 4.

Comparative Test 6

Production and press molding of SMC were carried out in the same way as in Example 8 except that a VCL polymer (Geon 103EP, manufactured by Japan Geon Co., Ltd.) was used instead of BPAC-VCL random copolymer of Example 8. Mechanical strength and mold shrinkage were measured in the same way as in Example 8. The results are shown in Table 4.

TABLE 3

| | | | SMC compression moldings | | | | | | | | | |
|---|---|---|---|---|---|---|---|---|---|---|---|---|
| | | | Examples | | | | | | Comparative Tests | | | |
| | | | 1 | 2 | 3 | 4 | 5 | 6 | 1 | 2 | 3 | 4 | 5 |
| Compounding Conditions | UPR (parts) | | 100 | 100 | 100 | 100 | 100 | 100 | 100 | 100 | 100 | 100 | 100 |
| | 40% ST solution of BPAC–VAC random copolymer | Origin | Reference Example 1 | Reference Example 2 | Reference Example 3 | Reference Example 4 | Reference Example 3 | Reference Example 3 | — | — | — | — | 13 |
| | | Amount (Parts) | 40 | 40 | 40 | 40 | 48 | 8 | — | — | — | — | — |
| | 40% ST solution of VAC polymer | Origin | — | — | — | — | — | — | Reference Example 6 | Reference Example 7 | Reference Example 7 | Reference Example 7 | — |
| | | Amount (parts) | — | — | — | — | — | — | 40 | 40 | 48 | 8 | — |
| | Calcium carbonate (parts) | | 50 | 50 | 50 | 50 | 52.9 | 38.5 | 50 | 50 | 52.9 | 38.5 | 50 |
| | Zinc stearate (parts) | | 7 | 7 | 7 | 7 | 7.4 | 5.4 | 7 | 7 | 7.4 | 5.4 | 7 |
| | t-Butylperoxybenzoate (parts) | | 1.4 | 1.4 | 1.4 | 1.4 | 1.5 | 1.1 | 1.4 | 1.4 | 1.5 | 1.1 | 1.4 |
| | Magnesium oxide (parts) | | 1.4 | 1.4 | 1.4 | 1.4 | 1.5 | 1.1 | 1.4 | 1.4 | 1.5 | 1.1 | 1.4 |
| | Glass fiber* | | 40 | 40 | 40 | 40 | 42.3 | 30 | 40 | 40 | 42.3 | 30 | 40 |
| | Pigment** | | 5.0 | 5.0 | 5.0 | 5.0 | 5.4 | 3.9 | 5.0 | 5.0 | 5.4 | 3.9 | 5.0 |
| Result of Test | Tensile strength (kg/mm²) | | 5.80 | 6.23 | 6.28 | 6.20 | 5.90 | 6.15 | 3.52 | 3.56 | 3.01 | 5.70 | 6.24 |
| | Bending strength (kg/mm²) | | 10.03 | 11.49 | 10.19 | 9.50 | 9.10 | 9.10 | 7.56 | 7.60 | 7.00 | 8.51 | 10.55 |
| | Mold shrinkage (%) | | 0.20 | 0.21 | 0.25 | 0.25 | 0.19 | 0.27 | 0.24 | 0.25 | 0.20 | 0.27 | 1.00 |

Note:
*Glass fiber: (Trade mark: chopped strand mat EM450-G-1 manufactured by Nippon Glass Fiber Manufacturing Co., Ltd.)
**Pigment: (Trade mark: TR2453 Blue, Manufactured by Toyo Ink Co., Ltd.)

TABLE 4

| | | SMC Press - Moldings | |
|---|---|---|---|
| | | Example 8 | Comparative Test 6 |
| Compounding composition (parts) | UPR | 100 | 100 |
| | BPAC—VCL random copolymer | 7 | — |
| | VCL polymer | — | 7 |
| | ST | 10.5 | 10.5 |
| | Calcium carbonate | 42 | 42 |
| | Zinc stearate | 5.9 | 5.9 |
| | t-Butylperoxybenzoate | 1.2 | 1.2 |
| | Magnesium oxide | 1.2 | 1.2 |
| | Glass fiber* | 34 | 34 |
| | Pigment** | 4.2 | 4.2 |
| Result of Test | Tensile Strength (kg/mm²) | 6.10 | 4.95 |
| | Bending Strength (kg/mm²) | 8.91 | 7.90 |
| | Mold Shrinkage (%) | 0.26 | 0.27 |

Note:
*Glass fiber: (Trade mark: Chopped strand mat EM450-G-1 manufactured by Nippon Glass Fiber Manufacturing Co., Ltd.)
**Pigment: (Trade mark: TR2453 Blue manufactured by Toyo Ink Co., Ltd.)

The embodiments of the invention in which an exclusive property or privilege is claimed are defined as follows:

1. An unsaturated polyester composition comprising:
    (a) 100 parts by weight of an α,β-ethylenically unsaturated polyester;
    (b) from 3 to 30 parts by weight of a random copolymer prepared by radical copolymerization, at a polymerization temperature of from 0° to 110° C., in the presence of a radical polymerization initiator, of (1) an unsaturated peroxycarbonate having the formula

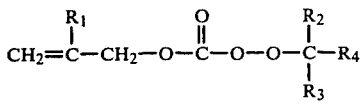

wherein $R_1$ is hydrogen or $C_{1-4}$ alkyl, $R_2$ and $R_3$ each is a $C_{1-4}$ alkyl, and $R_4$ is a $C_{1-12}$ alkyl or $C_{3-12}$ cycloalkyl, with (2) one or a mixture of two or more ethylenically unsaturated monomers selected from the group consisting of vinyl acetate, vinyl chloride, ethylene, allylacetate, allylchloroacetate, vinyl chloroacetate, butyl 3-butoxyacrylate, allylalcohol, 1,2-dichloroethylene, dibutyl maleate, diethyl maleate, isopropyl maleate, dimethyl maleate and methyl maleate, said ethylenically unsaturated monomers having Alfred-Price Q values of not more than 0.2, said random copolymer having a mean molecular weight of from $1 \times 10^4$ to $3 \times 10^5$ and containing from 0.5 to 20% by weight of peroxycarbonate groups, said random copolymer having units of the formula

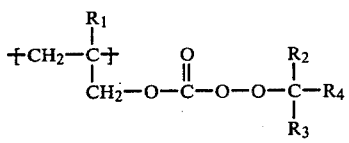

wherein $R_1$, $R_2$, $R_3$ and $R_4$ have the same meanings as defined above, and units derived from said ethylenically unsaturated monomer or monomers; and (c) from 27 to 190 parts by weight or one or a mixture of two or more polymerizable monomers selected from the group consisting of styrene, vinyltoluene, chlorostyrenes, diallylphthalate, vinyl acetate, acrylic acid esters and methacrylic acid esters.

2. A composition as claimed in claim 1, wherein said $\alpha,\beta$-ethylenically unsaturated polyester (a) is prepared from an $\alpha,\beta$-ethylenically unsaturated dibasic acid or alkyl ester thereof, a saturated dibasic acid or alkyl ester thereof, and a glycol.

3. A composition as claimed in claim 1, wherein said unsaturated peroxycarbonate is selected from the group consisting of t-butylperoxyallylcarbonate, t-hexylperoxyallylcarbonate, 1,1,3,3-tetramethylbutylperoxyallylcarbonate, p-methanperoxyallylcarbonate, t-butylperoxymethyallylcarbonate, 1,1,3,3-tetramethylbutylperoxymethallylcarbonate, and p-methanperoxymethallylcarbonate.

4. A composition as claimed in claim 1, wherein said polymerization initiator is selected from the group consisting of acetylcyclohexylsulfonylperoxide, isobutylperoxide, diisopropylperoxydicarbonate, lauroyl peroxide, benzoyl peroxide, t-butylperoxyisobutyrate, 1,1-bis-(t-butylperoxy)-3,3,5-trimethylcyclohexane, azobisisobutyronitrile, azobisdimethylvaleronitrile, persulfates and persulfate-bisulfite binary system initiators.

5. A composition as claimed in claim 1, wherein said random copolymer (b) is prepared in the presence of 0.01 to 5% by weight of a compensation agent selected from the group consisting of aldehydes, halogenated hydrocarbons, mercaptans, lower aliphatic alcohols, and lower aliphatic esters.

* * * * *